(12) United States Patent
Titus

(10) Patent No.: US 10,690,448 B2
(45) Date of Patent: Jun. 23, 2020

(54) METHOD AND APPARATUS FOR VARIABLE TIME PULSE SAMPLING

(71) Applicant: Raytheon Company, Waltham, MA (US)

(72) Inventor: Christopher J. Titus, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 595 days.

(21) Appl. No.: 15/411,148

(22) Filed: Jan. 20, 2017

(65) Prior Publication Data

US 2018/0209765 A1 Jul. 26, 2018

(51) Int. Cl.
| | |
|---|---|
| *F41G 7/26* | (2006.01) |
| *F41G 3/14* | (2006.01) |
| *G01S 7/487* | (2006.01) |
| *G01S 7/4863* | (2020.01) |
| *G01S 3/784* | (2006.01) |
| *G01S 7/48* | (2006.01) |
| *F41G 7/22* | (2006.01) |

(52) U.S. Cl.
CPC ............ *F41G 7/26* (2013.01); *F41G 3/145* (2013.01); *G01S 3/784* (2013.01); *G01S 7/4804* (2013.01); *G01S 7/487* (2013.01); *G01S 7/4863* (2013.01); *F41G 7/226* (2013.01); *F41G 7/2293* (2013.01)

(58) Field of Classification Search
CPC .......... F41G 7/26; F41G 7/226; F41G 7/2293; F41G 3/145; F41G 7/22; G01S 3/784; G01S 3/783; G01S 7/4804; G01S 7/4863; G01S 7/487; G01S 7/4873; G01S 7/486; G01S 7/4861; G01S 7/292; G01J 1/42
See application file for complete search history.

(56) References Cited

U.S. PATENT DOCUMENTS

| | | | |
|---|---|---|---|
| 3,701,145 A | 10/1972 | Bergin | |
| 4,227,185 A | 10/1980 | Kronlage | |
| 4,291,299 A | 9/1981 | Hinz et al. | |
| 4,544,914 A | 10/1985 | Chan et al. | |
| 6,020,840 A | 2/2000 | Ong | |
| 6,111,241 A | 8/2000 | English et al. | |
| 6,492,929 B1 | 12/2002 | Coffey et al. | |
| 6,501,412 B2 | 12/2002 | Tanabe | |

(Continued)

FOREIGN PATENT DOCUMENTS

| | | |
|---|---|---|
| EP | 0319160 A1 | 6/1989 |
| EP | 2294978 A1 | 3/2011 |
| EP | 2816312 A2 | 12/2014 |

OTHER PUBLICATIONS

International Search Report and Written Opinion from related PCT Application No. PCT/US2017/049399 dated Dec. 8, 2017.

(Continued)

*Primary Examiner* — John R Lee
(74) *Attorney, Agent, or Firm* — Burns & Levinson, LLP; Joseph M. Maraia

(57) ABSTRACT

Methods and apparatus for variable time sampling of optical pulses by a unit cell are disclosed. The methods may include detecting whether an amplitude of an optical pulse incident on one or more photo-detecting elements exceeds a sampling threshold, and while the pulse amplitude remains above the sampling threshold, iteratively sampling the optical pulse at a sampling rate that varies based on changes in the pulse amplitude.

16 Claims, 11 Drawing Sheets

(56) References Cited

U.S. PATENT DOCUMENTS

| | | | |
|---|---|---|---|
| 6,667,707 | B2 | 12/2003 | Mueck et al. |
| 6,850,180 | B2 | 2/2005 | Hales |
| 6,965,338 | B2 | 11/2005 | Irie et al. |
| 7,133,791 | B1 | 11/2006 | Su |
| 7,659,494 | B2 | 2/2010 | Lindgren |
| 7,760,131 | B2 | 7/2010 | Tyree et al. |
| 7,768,448 | B2 | 8/2010 | Tyree et al. |
| 7,839,317 | B1 | 11/2010 | Sauer |
| 7,842,908 | B2 | 11/2010 | Andresson |
| 7,858,939 | B2 | 12/2010 | Tener et al. |
| 8,022,350 | B2 | 9/2011 | Ackland |
| 8,179,296 | B2 | 5/2012 | Kelly et al. |
| 8,581,168 | B2 | 11/2013 | Linder et al. |
| 8,586,907 | B2 | 11/2013 | Ackland |
| 8,829,404 | B1 | 9/2014 | Rinker |
| 2011/0066053 | A1* | 3/2011 | Yazicioglu ............ A61B 5/0428 600/509 |
| 2012/0268303 | A1 | 10/2012 | Burr et al. |
| 2015/0369918 | A1* | 12/2015 | Tacke ...................... G01S 17/06 702/150 |
| 2016/0028985 | A1* | 1/2016 | Vogelsang ........ H01L 27/14641 348/294 |
| 2016/0349368 | A1* | 12/2016 | Stutz ....................... G01S 17/08 |
| 2016/0363688 | A1* | 12/2016 | Jorion ........................ G01T 1/17 |
| 2018/0209765 | A1* | 7/2018 | Titus ........................ F41G 3/145 |

OTHER PUBLICATIONS

Catalani "Criterion for the performance analysis of Synchronous and asynchronous sampling instruments based on nonlinear processing" (1992) (No month).

Sayiner et al. "A Level-crossing sampling scheme for A2D Conversion" IEE Transaction on Circuit and Systems: Analog and digital signal processing 43(4): 335-339 (1996) (No month).

Kemeny et al. "Multiresolution Image Sensor" IEEE Transactions on Circuits and Systems for video Technology 7(4): 575-583 (1997) (No month).

Kinniment et al. "Towards Asynchronous A-D Conversion" (1998) (No month).

Oenning et al. "Digital Detection with Asynchronous Sampling using Amplitude Error Prediction" IEE Transactions on Magnetics 34(4): 1931-1933 (1998) (No month).

Walden "Analog-to-Digital Converter Survey and Analysis" IEEE Journal on Selected Areas in Communications 17(4): 539-550 (1999) (No month).

Kinniment et al. "Synchronous and Asynchronous A-D Conversions" Iee Transaction on Very Large Scale Integration Systems 8(2): 217-220 (2000) (No month).

Allier et al. "A New Class of Asynchronous A/D Converters Based on Time Quantization" Proceedings of the Ninth International Symposium on Asynchronous Circuits and Systems, 10 pages (2003) (No month).

Kitchen et al. "A 64x64 CMOS digital pixel array based on pulse width analogue to digital conversion, with on chip lineansing circuit" Downloaded From: http://proceedings.spiedigitallibrary.org/ on Jul. 15, 2016 163-171 (2004).

Allier et al. "A 120nm Low Power Asynchronous ADC" ISLPED 60-65 (2005) (No month).

Kelly et al. "Design and testing of an all-digital readout integrated circuit for infrared focal plane arrays" Downloaded From: http://proceedings.spiedigitallibrary.org/ on May 16, 2016, 11 pages(2005).

Woo et al. "Time Based pixel level ADC with wide dynamic range for 2-D LWIR applications" Electronic Letters 41(14):2 pages (2005) (No month).

Guan et al. "A Level-Crossing Sampling Scheme for Non-Bandlimited Signals" IEEE ICASSP 3:381-383 (2006) (No month).

Olyaei "Focal-Plane Spatially Oversampling CMOS Image Compression Sensor" IEE Transactions on Circuits and systemn 54(1): 26-34 (2007) (No month).

Hwang et al. "Readout integrated circuits involving pixel-level ADC for microbolometers" IEEE International SoC Design Conference 3:70-71 (2008) (No month).

Kizhner et al. "New Methodology for Reducing Sensor and Readout Electronics Circuitry Noise in Digital Domain" IEEEAC 1542(8): 1-8 (2008) (No month).

Tyrrell et al. "Design Approaches for Digitally Dominated Active Pixel Sensors:Leveraging Moore's Law Scaling in Focal Plane Readout Design" Proc. of SPIE 6900: 16 pages (2008) (No month).

Andreou et al. "Noise Analysis and Comparison of Analog and Digital Readout Integrated Circuits for Infrared Focal Plane Arrays" IEEE 695-700 (2009) (No month).

Arai et al. "A Condition for Better Estimation Using Asynchronous Sampling than Synchronous Sampling" Proceedings of the European Control Conference 3719-3724 (2009) (No month).

Nilchi et al. "Focal-Plane Algorithmically-Multiplying CMOS Computational Image Sensor" IEEE Journal of Solid-State Circuits 44(6): 1829-1839 (2009) (No month).

Tyrrell et al. "Time Delay Integration and In-Pixel Spatiotemporal Filtering Using a Nanoscale Digital CMOS Focal Plane Readout" IEEE Transactions on Electron Devices 56(11): 2516-2523 (2009) (No month).

Brown et al. "Digital Pixel Focal Plane Array Development" Downloaded From: http://proceedings.spiedigitallibrary.org/ 10 pages (2010) (No month).

Mishali et al. "From Theory to Practice: Sub-Nyquist Sampling of Sparse Wideband Analog Signals" IEEE Journal of Selected Topics in Signal Processing 4(2): 275-391 (2010) (No month).

Petrellis et al. "Asynchronous Analog-to-Digital Conversation Techniques" 19 pages (2010) (No month).

Senay et al. "Adaptive Level-Crossing Sampling and Reconstruction" 18th European Signal Processing Conference 1296-1300 (2010) (No month).

Trakimas et al. "Adaptive resolution asynchronous ADC architecture for data compression in energy constrained sensing application" IEEE Transactions on Circuit and Systems 58(5): 921-934 (2010) (No month).

Tropp et al. "Beyond Nyquist: Efficient Sampling of Sparse Bandlimited Signals" IEEE Transactions on information teory 56(1): 520-544 (2010) (No month).

Alvarado et al. "The Integrate-and-Fire Sampler: A Special Type of Asynchronous sigma-delta Modulator" IEEE 2031-2034 (2011) (No month).

Kafashan et al. "Asynchronous analog-to-digital converter based on level-crossing sampling scheme" EURASIP Journal on Advances in Signal Processing 109: 1-12 (2011) (No month).

Woo et al. "ROIC with Adaptive Reset Control for Improving Dynamic Range of IRFPAs" IEEE 4 pages (2011) (No month).

Can et al. "Asynchronous sampling and reconstruction of sparse signals" 20th European Signal Processing Conference 854-858 (2012) (No month).

Hand et al. "A Non-Uniform Sampling ADC Architecture with Embedded Alias-Free Asynchronous Filter" Signal Processing for Communications Symposium 3707-3712 (2012) (No month).

Chen et al. "A 1V 14b Self-Timed Zero-Crossing-Based Incremental delta sigma ADC" IEEE International Solid-State Circuits Conf. 274-275 (2013) (No month).

Kim "An Asynchronous Sampling-Based 128x128 Direct Photon-Counting X-Ray Image Detector with Multi-Energy Discrimination and High Spatial Resolution" IEEE Journal of Solid-State Circuits 48(2): 541-558 (2013) (No month).

Liu et al. "Design of High-speed Sampling System in Pulse Laser Application" Optics and Photonics Journal, Scientific Research 3: 73-75(2013) (No month).

Weltin-Wu et al. "An Event-driven Clockless Level-Crossing ADC With Signal-Dependent Adaptive Resolution" IEEE Journal of Solid-State Circuits 48(9): 2180-2190 (2013) (No month).

Fernandez-Cull et al. "Smart Pixel Imaging with Computational-imaging Arrays" Downloaded From: http://proceedings.spiedigitallibrary.org/ 13 pages (2014) (No month).

(56) References Cited

OTHER PUBLICATIONS

Little et al. "Digital pixel CMOS focal plane array with on-chip multiply accumulate units for low-latency image processing" Downloaded From: http://proceedings.spiedigitallibrary.org/ 8 pages (2014) (No month).

Schultz et al. "Digital-Pixel Focal Plane Array Technology" Lincoln Laboratory Journal 20(2): 36-51 (2014) (No month).

Temple et al. "Advanced 3D mixed-signal processor for infrared focal plane arrays: fabrication and test" IEEE 7 pages (2014) (No month).

Martinez-Nuevo et al. "Derivative Level-Crossing Sampling" IEEE Transactions on Circuit and Systems 62(1): 11-15 (2015) (No month).

EP OA from related European Application No. 17764746.8 dated Mar. 16, 2020.

* cited by examiner

METHOD AND APPARATUS FOR VARIABLE TIME PULSE SAMPLING

BACKGROUND

Embodiments described in this disclosure relate generally to the field of signal pulse measurement, and more particularly to semi-active laser (SAL) pulse measurement apparatus and methods.

Pulsed lasers are used in a variety of applications, including but not limited to, e.g., LIDAR, laser guidance, remote sensing and identification, active countermeasures, among others. In SAL seeker guidance systems such as shown in simplified FIG. 1, an operator 30 (e.g., onboard an aircraft or on the ground) of a laser designator 20 may "paint" a target 40 with a laser beam 40), and when a missile 50 including a SAL seeker is close enough for some of the laser energy 60 reflected from the target 40 to reach the field of view of a missile 10, a seeker system of the missile 10 detects the laser energy 60, associate the energy with the laser painting, find the direction from which the laser energy is being reflected, and uses the directional information to guide the missile 10 toward the target 40.

Efforts exist to improve performance and cost efficiency of SAL receivers have included focus on detector array sensitivity, in addition to power and size requirements (e.g., development of read out integrated circuits (ROICs.) It is advantageous for pulsed laser receivers to be able to accurately measure the shape of pulses with widths in the 5-20 nanoseconds range, arriving at tens of milliseconds intervals, that may have complex (non-Gaussian) temporal shapes. Conventional SAL receivers typically include a detector array, analog circuitry operably coupled to each of the detector array elements that detects photocurrents induced by photons striking the detector array and supplies corresponding signals to a dedicated temporal processor. New laser technologies enable generation of eye-safe laser energy and detection with InGaAs or HgCdTe detectors that have high capacitance, constraining their size, and requiring larger arrays (or scanning) to obtain a wide field of view (FOV). The temporal processor then compares intensity ratios across the detector array elements to determine the centroid of any detected laser spot, which is provided to the main navigational computer as line-of-sight guidance data. There is a continual demand to reduce the complexity, part count, weight, envelope, and cost of these various components (e.g., optical components, sensors, digital and analog processing elements, etc.).

Thus, what is needed is a more sensitive SAL pulse sensing technology with very high temporal resolution, to sample asynchronous, low frequency pulsed signals with large dynamic range. The inventors have recognized the advantages and benefits associated with improved and new techniques for SAL pulse measurement, and related architectures, that address the size, weight and power related shortcomings of currently available measurement apparatus and methods recognized by those of skill in the art.

SUMMARY

Methods and devices are presented for variable time sampling of pulses, such as laser pulses. In one embodiment, a method of variable time sampling of optical pulses comprises detecting whether the amplitude of an optical pulse incident on one or more photo-detecting elements exceeds a sampling threshold, and while the pulse amplitude remains above the sampling threshold, iteratively sampling the optical pulse at a sampling rate that varies based on changes in the pulse amplitude.

The iterative sampling may comprise resetting an interval of the sampling rate upon each discrete detection of a change in the pulse amplitude exceeding at least one amplitude change threshold. The one or more amplitude change threshold may be set prior to iteratively sampling the optical pulse, and/or may be dynamically set in response to an input (such as a user input.)

The sampling rate may vary in response to changes in an integral of the pulse amplitude and/or changes in the pulse amplitude. In one embodiment, the sampling rate interval may be reset upon each discrete detection of a change in the pulse amplitude integral exceeding at least one amplitude integral change threshold. For example, the sampling rate may be increased with increasing pulse amplitude, and be decimated with decreasing pulse amplitude.

A variety of pulse features may be extracted through the sampling. For example, a peak amplitude of the pulse may be captured when the time interval of the sampling rate is at a minimum. The pulse's shape may be reconstructed from sampled data for the pulse, including the peak amplitude of the pulse and other features.

In another embodiment, iteratively sampling the optical pulse comprises enabling pulse detection logic to simultaneously gate the pulse amplitude to a first integrator, and enable the first integrator and a sample time integrator, wherein if the pulse detection logic is disabled, the first integrator and sample time integrator are held in a reset state.

The integrated pulse amplitude output from the first integrator may be compared to a Δ-amplitude threshold that effectively determines the sampling rate, and if it exceeds the threshold, the logic causes capturing of a Δt output of the sample time integrator associated with the integrated pulse amplitude exceeding the Δ-amplitude threshold, and then resetting the sample time integrator and first integrator.

When the pulse amplitude falls back below the threshold, the pulse detection logic may be disables, thereby resetting the first integrator and sample time integrator, and causing a sample controller to signal externally that laser pulse sampling data is available for reading. The sample time integrator may be fed a sample timing value Ts that controls the time resolution of the sample time integrator.

In some embodiments, the time varying pulse sampling is performed by a plurality of unit cells, and the pulse detection logic of each unit cell may be enabled in response to control logic from a neighboring unit cell. Each unit cell may include the one or more photo-detecting elements comprising a plurality of adjacent pixels. An angle or arrival of the pulse may be computed based on changes in respective peak amplitudes measured by the plurality of adjacent pixels.

In other embodiments, circuitry is described that employs the asynchronous sampling techniques. In certain embodiments, the techniques are embodied in semi-active laser receivers comprised of multiple unit cells, each including an array of photo-detecting elements configured to receive an optical pulse, comparing means for detecting whether an amplitude of the received optical pulse exceeds a sampling threshold, and a signal processing circuit configured to, while the pulse amplitude remains above the sampling threshold, iteratively sample the optical pulse at a sampling rate that varies based on changes in the pulse amplitude.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein.

DETAILED DESCRIPTION

Novel techniques and apparatus are disclosed in the following description and related figures directed to specific embodiments. Alternate embodiments may be devised without departing from the scope of the invention. Additionally, well-known elements of technologies associated with the embodiments will not be described in detail or will be omitted so as not to obscure the relevant details of the novel methods and apparatus. The word "exemplary" is used herein to mean "serving as an example, instance, or illustration." Any embodiment described herein as "exemplary" is not necessarily to be construed as preferred or advantageous over other embodiments. Likewise, the term "embodiment" and the descriptive language associated with each use of the term do not require that all embodiments include the discussed feature, limitation, advantage or mode of operation. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, several embodiments are described in terms of sequences of actions to be performed by, for example, "logic configured to" perform said actions. It will be recognized that various actions described herein can be performed by specific circuits (e.g., application specific integrated circuits (ASICs)), by program instructions being executed by one or more processors, or by a combination of both. Additionally, the sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 2:
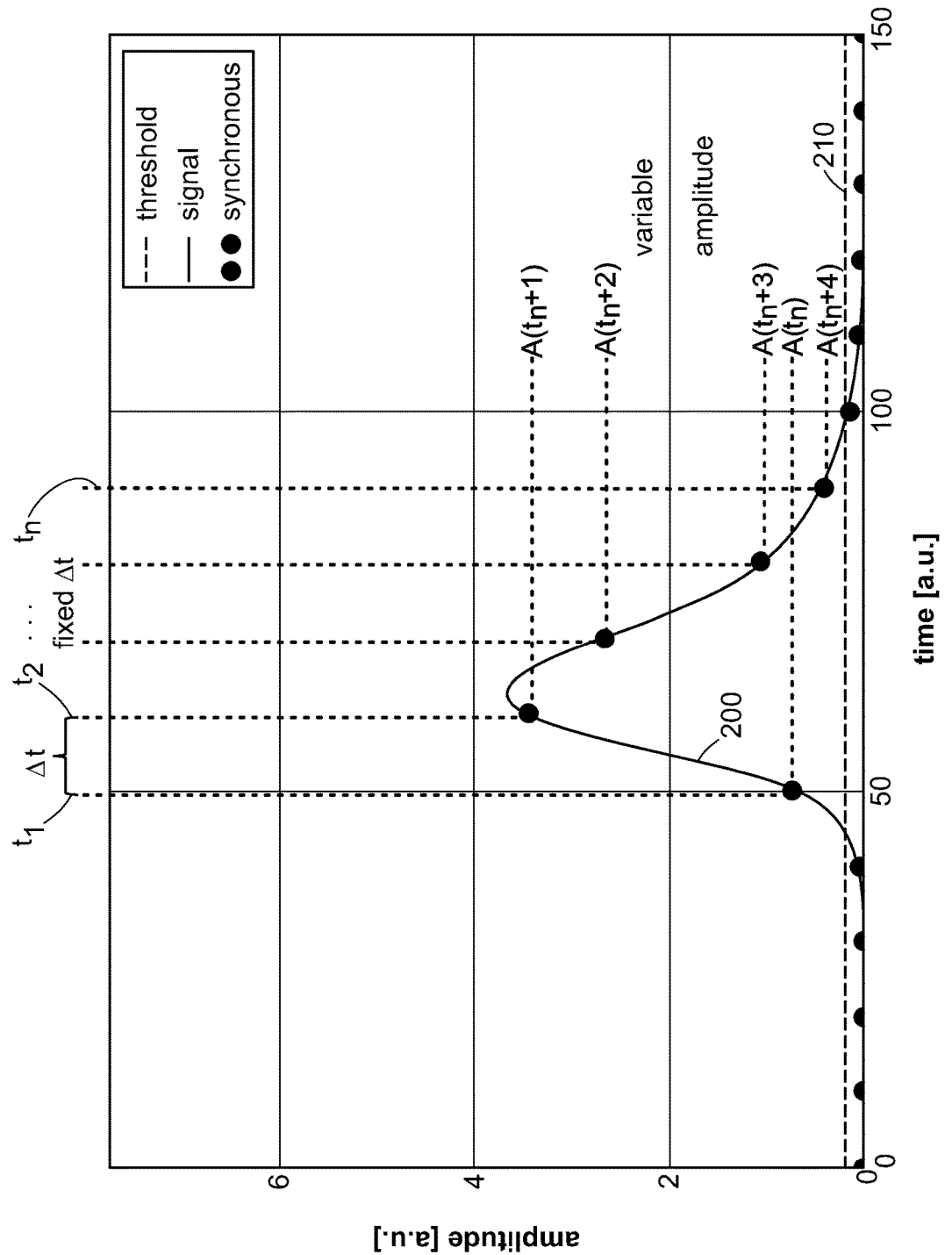
FIG. 2 is a graph of an optical pulse sampled according to conventional, constant time interval sampling.

With reference to FIG. 2, various types of analog to digital converters (ADCs) are known in which an analog pulse signal 200 to be converted is periodically sampled (i.e., at times $t_1, t_2 \ldots t_n$) above a signal detection threshold 210 at a fixed interval $\Delta$time (or $\Delta t$), corresponding to a constant sampling rate that is often set to be twice the highest frequency of the analog signal 200. However, the sample resolution is typically marginal to inadequate for shorter pulse widths. Each sampled amplitude $A(t_n) \ldots A(t_{n+4})$ value is converted into a corresponding digital signal. Alternatively, only changes in the amplitude magnitude of the analog signal are recorded as digital signals. A clock (which may consume relatively large amounts of power) generates the synchronous sampling signal. To provide data for complex pulse shapes and multiple pulse environments, continuous higher sampling rates must be used that result in an increased amount of digital information per unit time, with commensurate storage and/or transmission requirements. For low pulse repetition frequency (PRF) laser signals, this can result in sampling a significant amount of noise for up to 99.9999% of the operation time of the ADC, wasting said storage and/or transmission capacity.

Accordingly, in such known ADCs the continuous, synchronous sampling rate represents a balancing of the requirements of converting high frequency signal components and reducing the amount of digital information to be handled. If the highest frequency component of an analog signal to be converted is not known, an insufficient number of samples may result in inaccurate pulse peak amplitude 205 and pulse width estimates. Furthermore, if an analog signal to be converted includes both very high and low (or zero) frequency portions, this compromise is not acceptable because it results in loss of high frequency signal components and/or production of an excessive amount of digital information.

Figure 3:
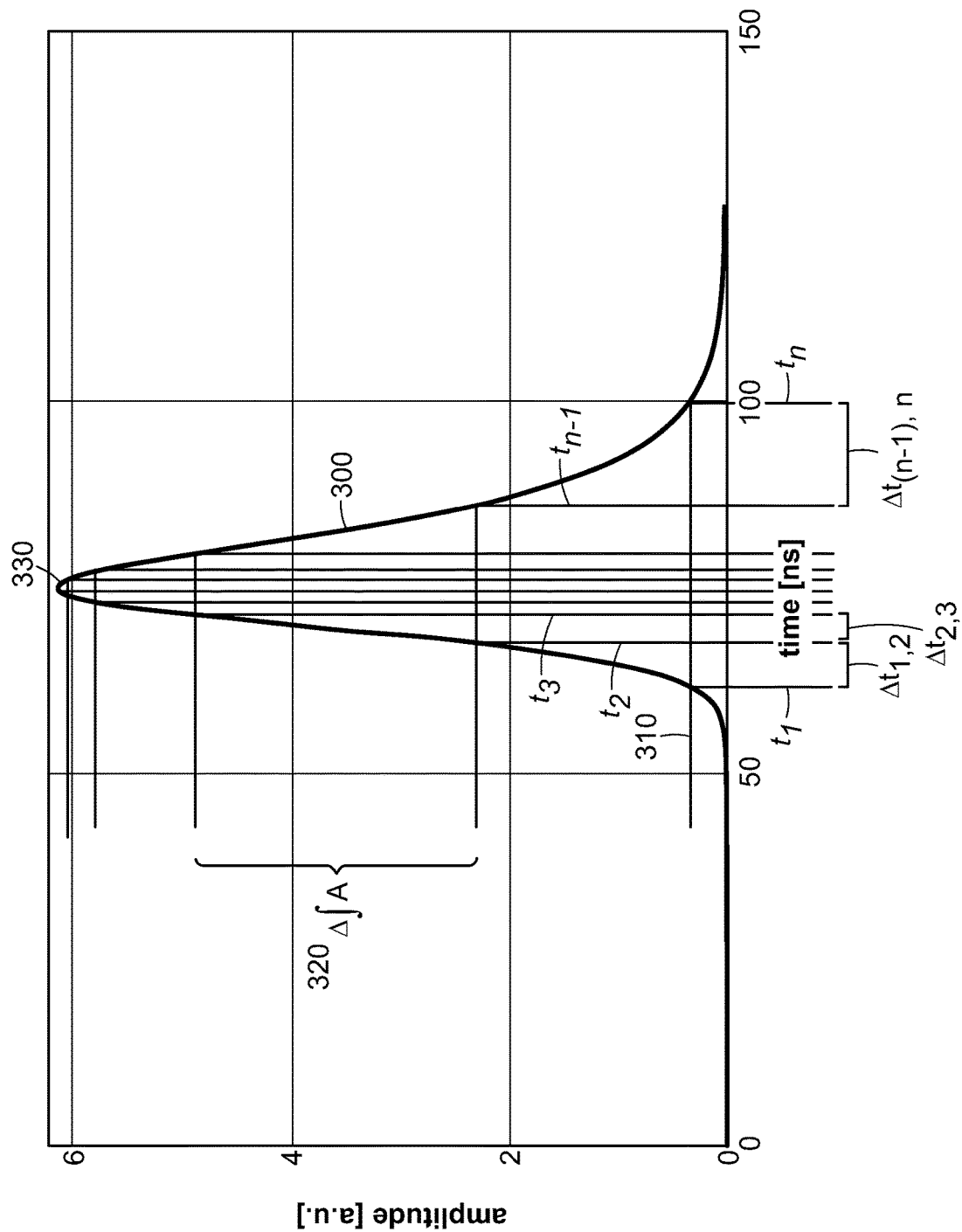
FIG. 3 is an exemplary graph of an optical pulse being asynchronously sampled.
Figure 4:
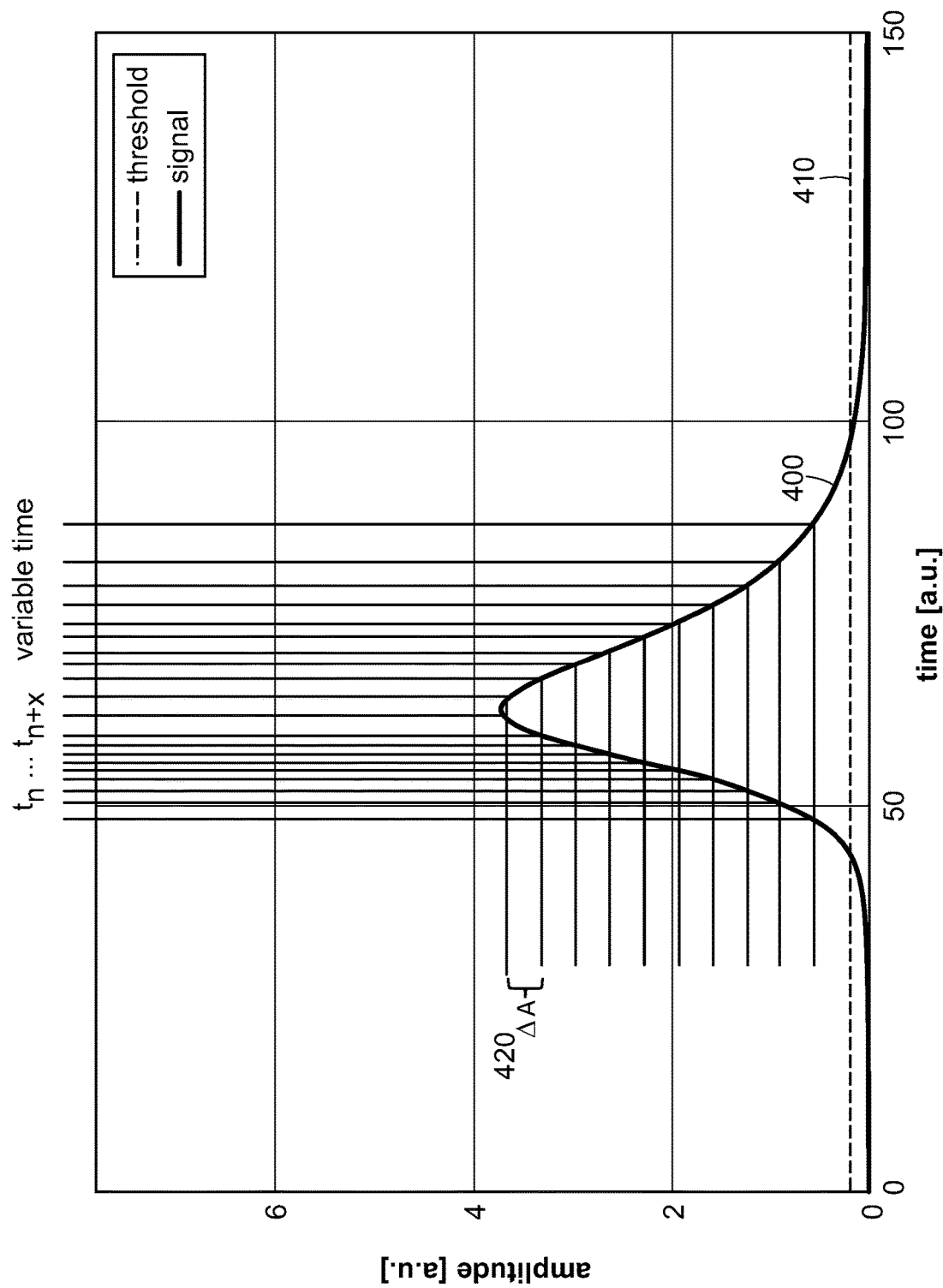
FIG. 4 is an exemplary graph of an optical pulse being asynchronously sampled.

A novel sampling technique is illustrated in the chart of FIG. 3, where a pulse signal 300 is asynchronously sampled while the pulse amplitude is detected to exceed threshold amplitude 310. During the asynchronous sampling time (e.g., from $t_1$ through $t_n$), the sampling rate varies in proportion to the pulse shape of pulse signal 300. It may be observed that sampling interval $\Delta t_{1,2}$ between $t_1 \rightarrow t_2$ differs from interval $\Delta t_{2,3}$ between $t_2 \rightarrow t_3$, and from interval $\Delta t_{(n-1),n}$ of $t_{(n-1)} \rightarrow t_n$, etc. A number of embodiments are described below, wherein the sampling rate varies in response to changes in the pulse amplitude of the pulse being sampled. In embodiments such as shown in FIG. 4, for example, a sampling control signal may be reset each time the amplitude of a detected pulse signal 400 is above a sampling threshold 410 and changes by an amount exceeding a (predetermined, or input adjustable) pulse amplitude change threshold $\Delta A$ 420. Stated another way, the sampling rate interval $\Delta t$ may be iteratively reset upon each detection of a level crossing of the pulse amplitude change threshold by the change in the pulse amplitude of the pulse signal. It can be seen that this may result in varying sampling time intervals. In other embodiments, such as shown in FIG. 3, the pulse may be sampled (above the threshold amplitude 310) when the integral of the pulse signal ($\Delta \int A$, the area below the pulse signal 300 representing the pulse's energy)

changes by an amount exceeding a (predetermined or, dynamically input) pulse amplitude signal integral change threshold $\Delta\int A$ 320. In response to each change threshold(s) level crossing detection, logic in the sampling apparatus causes a re-sampling of the pulses 300, 400. As shown in FIG. 3, higher pulse amplitudes (e.g., pulse signal peak 330) and/or steeper signal rise times may result in increased sampling rates. These disclosed techniques advantageously result in greater numbers of samples for all pulse amplitudes and pulse widths in appropriate sampling windows, leading to more accurate pulse shape reconstruction (e.g., by interpolation and/or curve-fitting between sampling points.) For example, the conventional sampling shown in FIG. 2 might include 3-15 samples taken in 1-10 nanosecond intervals, whereas sampling according to the embodiment shown in FIG. 3 might have 10 times the sampling speed (e.g., 20 to 30 or more samples at 0.1-1 nanosecond sampling intervals), resulting in a more accurate portrayal of pulse signal peak 330.

Figure 5:
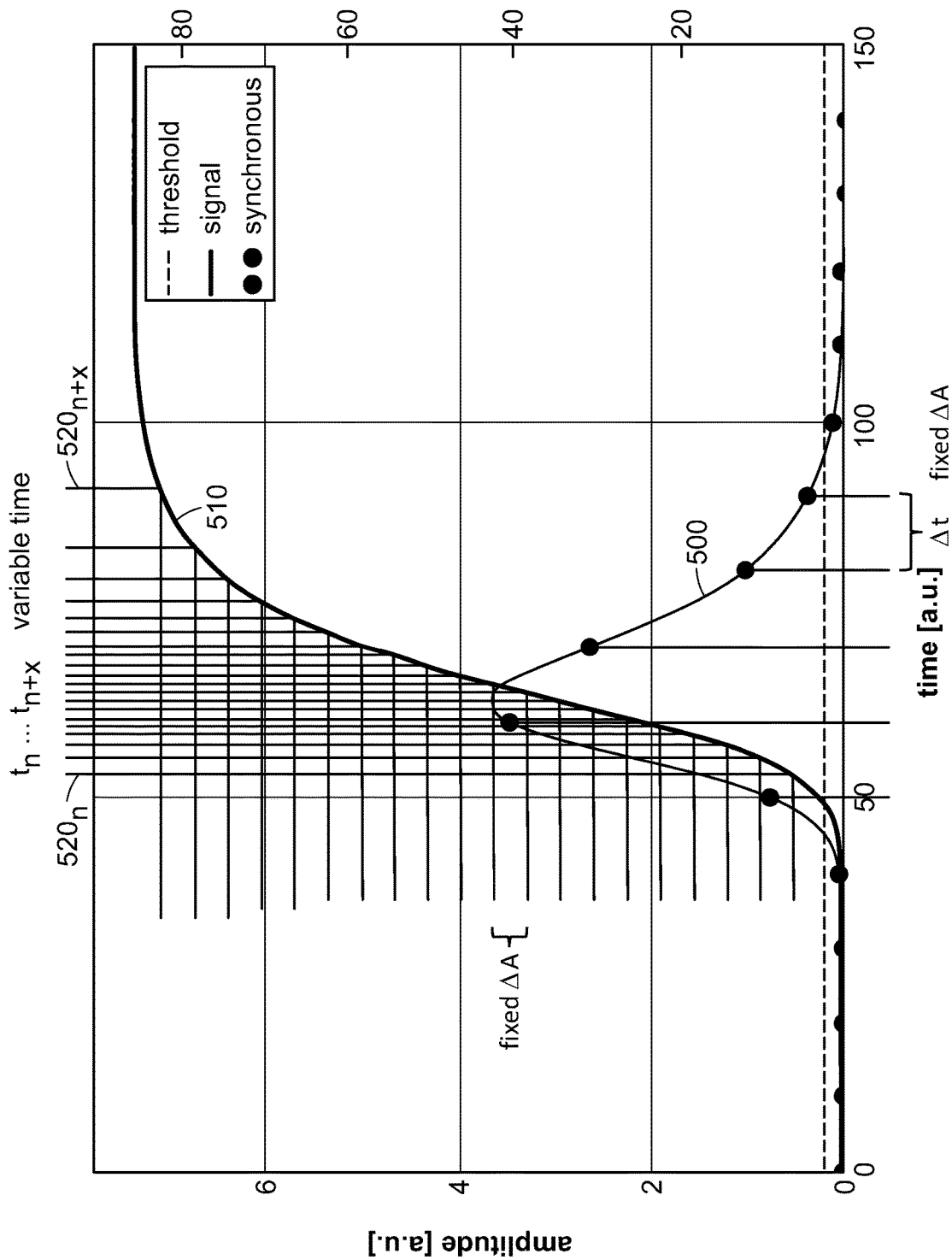
FIG. 5 is a chart illustrating comparative sampling techniques, one conventional and the other according to an embodiment of the disclosure.

FIG. 5 illustrates a comparison of conventional sampling and the new techniques disclosed herein. Pulse signal 500 is shown sampled according to a known synchronous (fixed $\Delta t$ interval) sampling technique, while pulse signal 510 is asynchronously sampled according to the new fixed $\Delta A$ level crossing technique. It is shown that the new technique provides a greater number of data samples $520_n \ldots 520_{n+x}$, at times $t_n$ through $t_{n+x}$, compared to the data samples 530a through 530e that might be synchronously acquired by a conventional (cSAL) receiver.

A significant advantage of the asynchronous sampling technique is that pulse sampling only proceeds above the pulse detection threshold(s) 310, 410, resulting in over a 90% reduction in power usage by the ADC, and a commensurate savings in the size of required circuitry, especially in low PRF environments (e.g., SAL pulse seeking, etc.)

Figure 6:
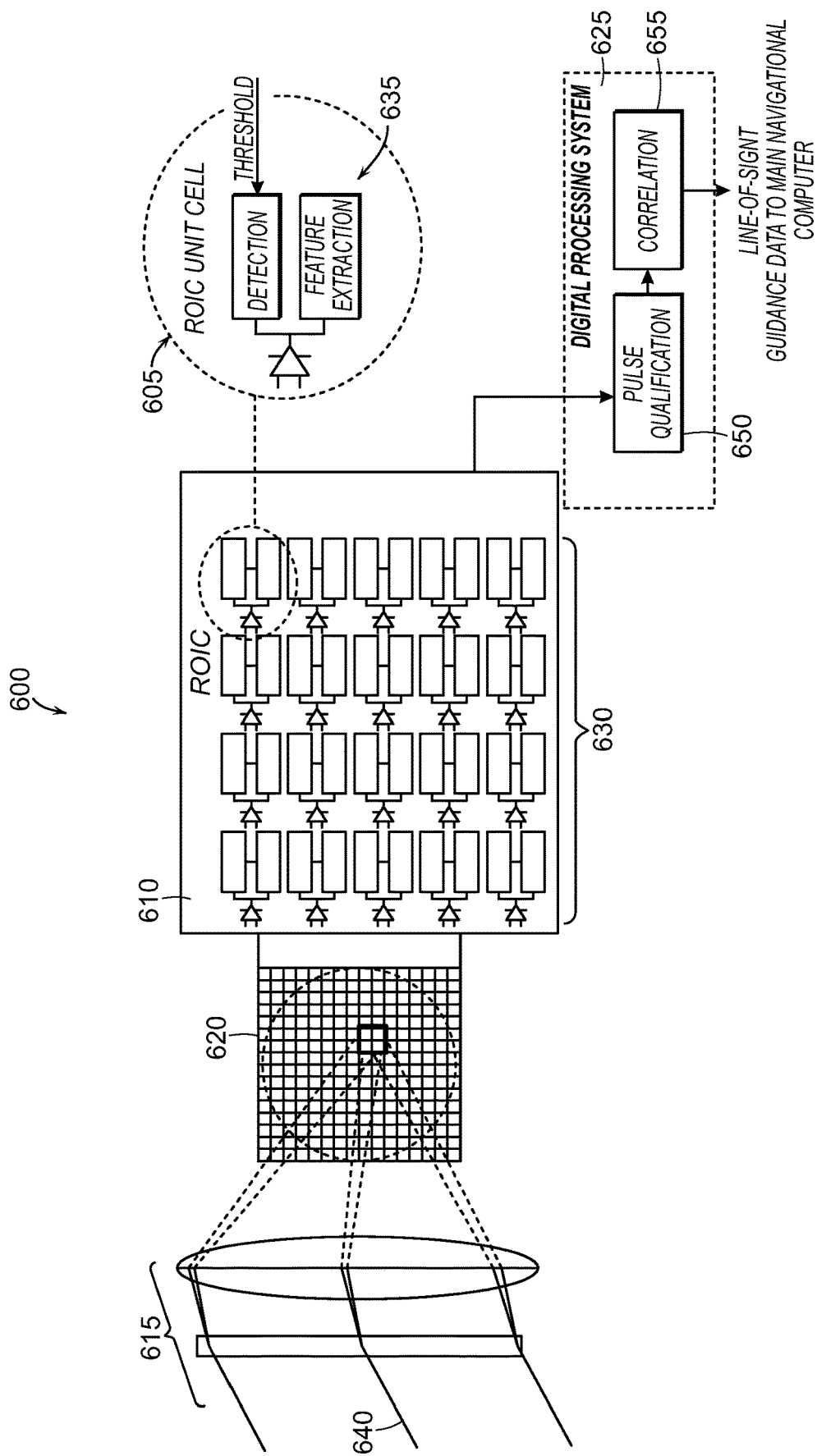
FIG. 6 is a block diagram of an example asynchronous sampling architecture embodied within a SAL receiver.

Thus, according to aspects of these embodiments, an ADC and variable time sampling methods are provided in which the sampling rate varies in response to changes in the pulse signal amplitude features (including the integrated pulse signal representing energy) of the incident pulse, proportionally as the selected pulse features cross selected sampling threshold levels. FIG. 6 schematically illustrates a perspective view of an exemplary pulsed laser receiver 600 in which embodiments of the variable time sampling techniques and architecture (e.g., embodied in one or more unit cells 605 of a read-out integrated circuit, ROIC 610) may be employed. Pulsed laser receiver 600 may be designed to measure several important features of a laser pulse, including time of arrival, angle of arrival, peak amplitude(s) and pulse shape. As noted above, existing art makes continuous synchronous measurements of received power vs. time. Such approaches typically require larger collecting area and high signal gain for pulse detection, and older systems often lacked an ability to resolve closely spaced pulses.

The pulsed laser receiver 600 may include collection optics 615, a detector array 620, ROIC 610, and a digital processing module 625. The ROIC 610 includes a two-dimensional array 630 of parallel processing unit cells 605, each of which may comprise an ADC circuitry 635 that may receive external inputs, including control signals from other unit cells. Unit cell circuitry 635 may be configured to convert electric signals from an associated photo-detecting element (or group of elements) of the photodetector array 620 to one or more voltage signals, such as through use of capacitors for integrating charge from the current mode signal.

An incident laser beam 640 may be diffracted through collection optics 615 and projected onto the photodetector array 620. The collection optics 615 are preferably dimensioned and arranged to receive the entire laser beam 640.

Detector array 620 may be comprised of photodetector elements, which in some embodiments may advantageously be fabricated from materials such as InGaAs and HgCdTe responsive to eye-safe wavelengths (e.g., 1.54 µm or 1.64 µm) or conventional 1.06 µm lasers. Eye-safe sensors are described in U.S. Pat. No. 7,842,908 to Andresson, entitled "Sensor for Eye-Safe and Body-Fixed Semi-Active Laser Guidance". The detector array 620 may also employ digital pixel focal plane array technology, such as developed at MIT Lincoln Laboratory (Bedford, Mass.), and/or as described in U.S. Pat. No. 8,022,350 to Ackland, entitled "Imaging Pixel Comprising a Comparator to Compare Integrated Photocurrent to a Reference Value", and U.S. Pat. No. 9,154,713 to Denham et al., entitled "Repartitioned Digital Pixel". The contents of each of the foregoing publications are incorporated by reference in their entirety. Digital pixels enable temporal integration of short laser pulses with large flux and very large flux rates (e.g., $10^4$-$10^{11}$ photons over 10-25 nanoseconds.) This enables efficient, high resolution sampling of short pulses for extracting pulse features (e.g., pulse peak, shape, width, rise and fall times) and, optionally, discrimination between pulses.

Figures 7A, 7B:
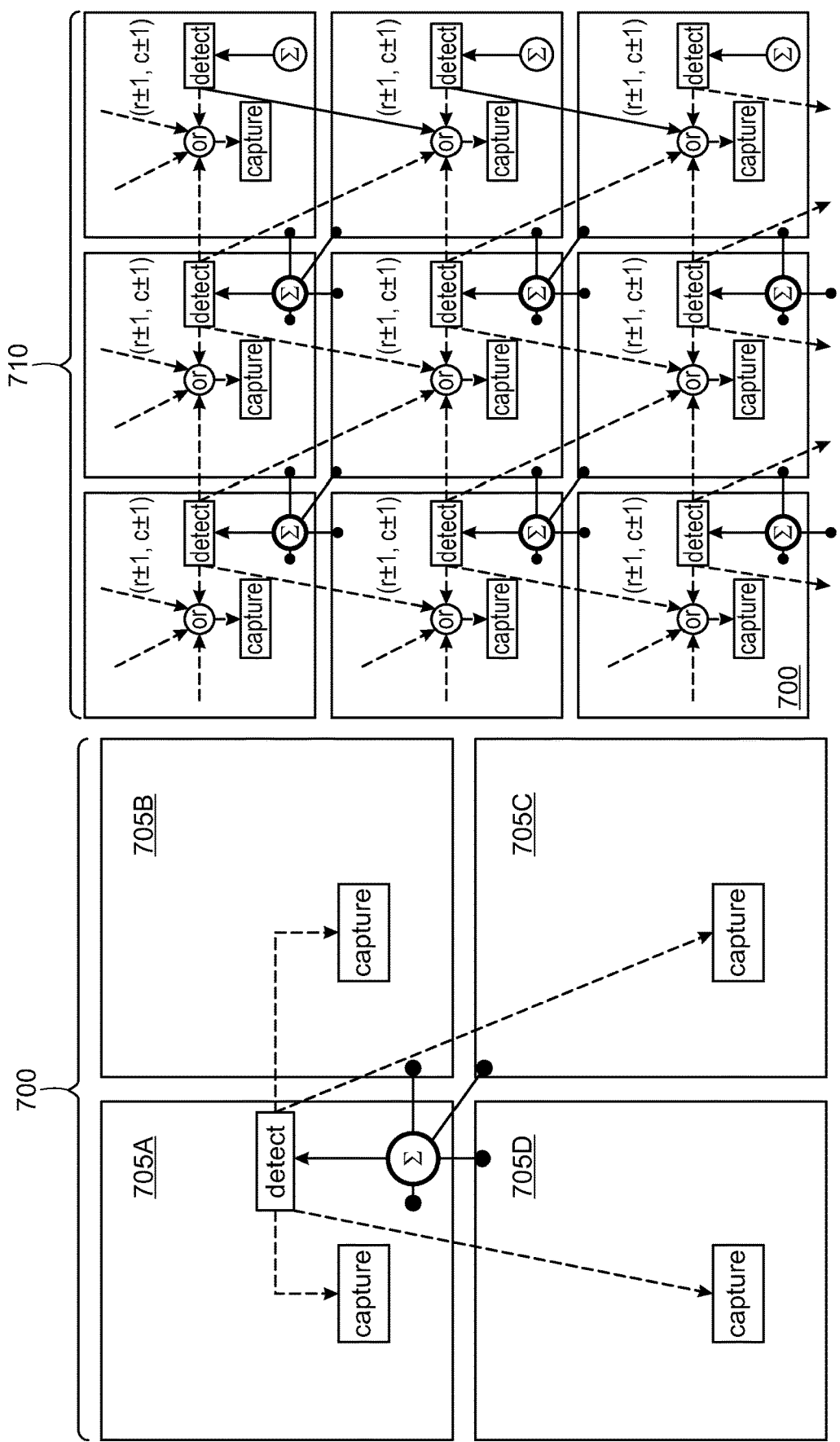
FIGS. 7A and 7B are illustrations, respectively, of an example single four-quadrant detector and an array of such detectors.

Detector array 620 may be comprised of one or any suitable number of conventional four-quadrant detectors 700, such as shown in FIGS. 7A and 7B, each of which is electronically divided into four quadrants 705A through 705D. The detectors 700 may have any suitable shape, such as square, circular, or the like. For example, a circular configuration may be preferred for missile guidance applications, while a square or rectangular arrangement may be preferred for non-missile applications, such as a tracking system onboard an aircraft. Other detector array configurations and sizes may also be used without departing from the scope of the present teachings.

Figure 1:
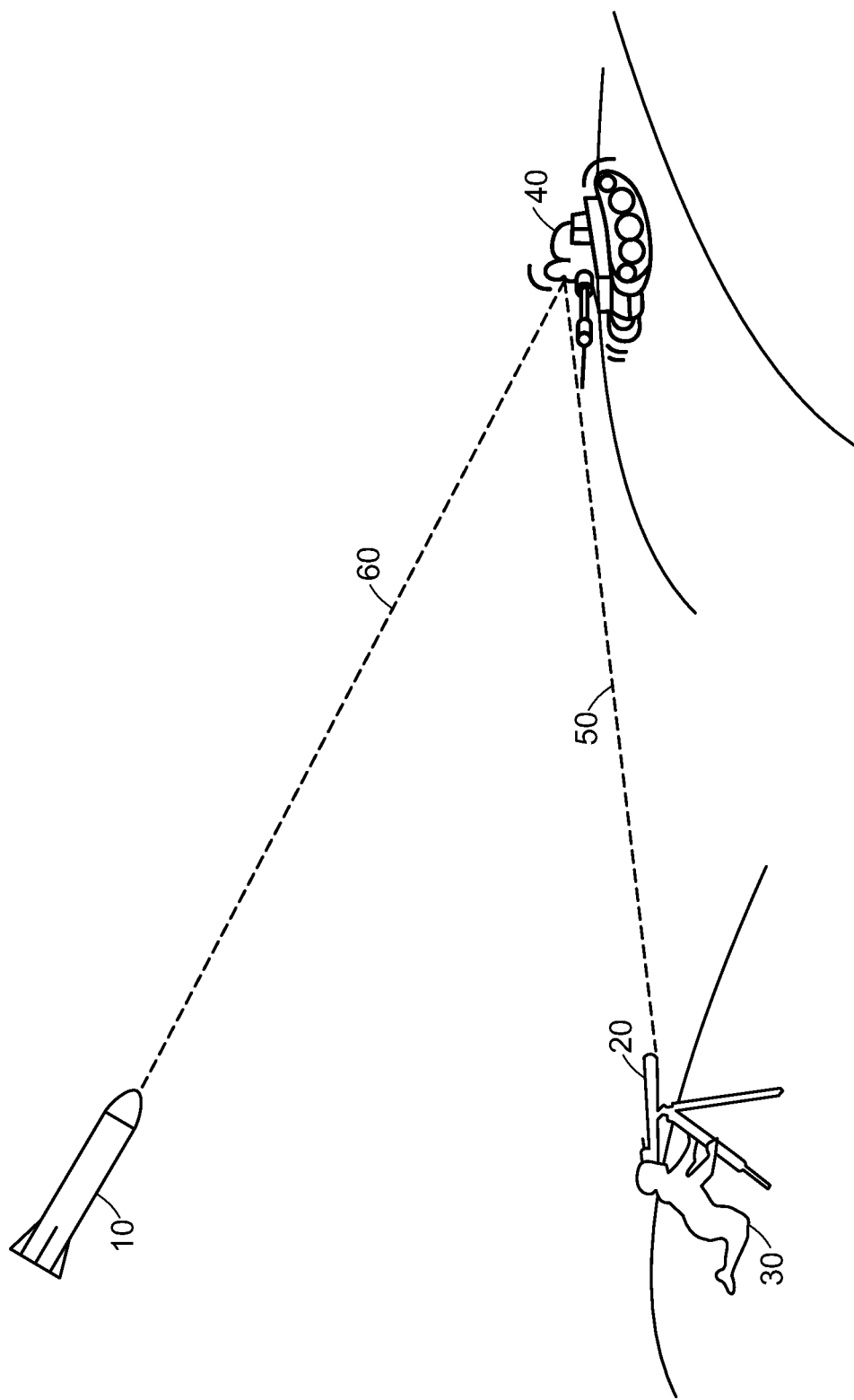
FIG. 1 is an illustration of an environment in which a SAL receiver may be utilized.

A circuit within each detector 700 may accumulate charge from a photo-diode of array 620 that corresponds to the flux of the incident laser pulse. The charge may be accumulated on a capacitive element that effectively integrates charge, producing a voltage corresponding to the intensity of the flux over a given time. In operation, each unit cell 605 of ROIC 610 receives the output signals generated by an associated four quadrant detector 700. With reference again to FIG. 1, a SAL receiver integrated into missile 10 may use the amplitude levels measured by each quadrant to adjust the heading of the missile 10 until the received laser beam 60 is centered in the detector array 620 such that equal amounts of energy are detected in each quadrant 705A-705D. Azimuth and elevation of the incident laser beam 60 may be computed, for a receiver equipped with a single, four-quadrant detector, according to the following known equations:

$$Az = \frac{(B+C)-(A+D)}{A+B+C+D}, \text{ and}$$

$$El = \frac{(A+B)-(C+D)}{A+B+C+D}.$$

If detector array 620 is comprised of an array 710 of four-quadrant detectors 700, such as shown in FIG. 7B, the following equations may be used to determine azimuth and elevation:

$$Az := Az_n + \text{angle}\left[\frac{(S_{r-1,c+1} + S_{r+1,c+1}) - (S_{r-1,c-1} + S_{r+1,c-1})}{S_{r-1,c-1} + S_{r-1,c+1} + S_{r+1,c+1} + S_{r+1,c-1}}\right] \text{ and}$$

$$El := El_n + \text{angle}\left[\frac{(S_{r-1,c-1} + S_{r-1,c+1}) - (S_{r+1,c-1} + S_{r+1,c+1})}{S_{r-1,c-1} + S_{r-1,c+1} + S_{r+1,c+1} + S_{r+1,c-1}}\right]$$

Figure 8A:
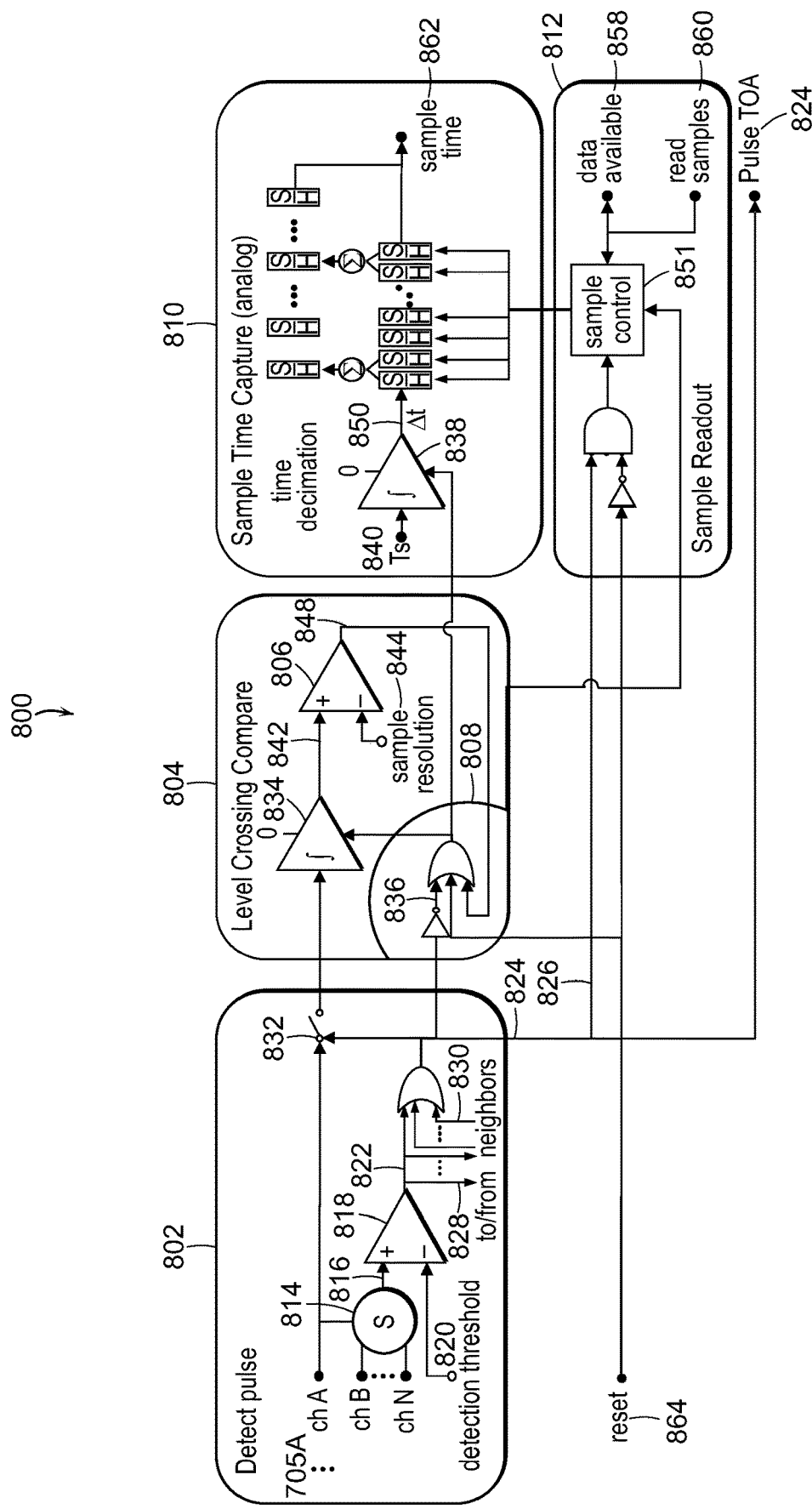
FIGS. 8A and 8B are block diagrams of exemplary unit cell circuitries.

An embodiment of the variable time sampling technique wherein the asynchronous sampling interval is dependent on changes in the integrated pulse signal amplitude will now be described with reference to FIG. 8A, which illustrates an exemplary architecture 800 for an individual unit cell 605 within ROIC 610. In various implementations, each unit cell 605 may include one or more of: (a) a photodetector (not shown) to receive incident radiation and provide an analog electric signal in response to the incident radiation; (b) a pulse detection circuit 802; (b) a level crossing comparison circuit 804 including aa thresholding component (e.g., comparator 806) and a power management circuit 808; (c) a sample time capture circuit 810; and (d) sample readout circuitry 812. Some or all of these circuits may include digital logic to process the digital signals and provide pixel data output. It should be appreciated that, in some implementations, respective unit cells 605 may not necessarily include the photodetector itself. Analog amplitude measurements output on the detector channels 705A-705N may be received by a summing circuit 814 which adds the signals from each detector element and outputs the resulting amplitude sum 816, representing the total energy received by a four-quadrant detector in one unit cell 605. The channel amplitude sum 816 may be compared at comparator 818 against a provided threshold value 820. When the threshold value 820 is exceeded, comparator 818 instantaneously enables "pulse detected" logic 822. Pulse detected logic 822 is used to capture the incident pulse's time of arrival 824 (TOA) upon a threshold detection crossing (high=true), and to enable internal control of the sampling control logic 826. A signal 828 from sampling control logic 826 may be sent to neighboring unit cells 605 (not shown) to enable simultaneous data collection in those cells, and similar logic signals 830 may be received from the neighboring unit cells that could enable pulse detected logic 826.

Pulse detection logic 826 may be used to gate 832 the channel amplitude 816 to a level crossing integrator 834. Simultaneously, a negation signal 836 of the pulse detection logic 826 enables level crossing integrator 834 and a sample time integrator 838. The sample time integrator 838 may be provide a sample time value, $T_s$ 840 that can be used to control the time resolution with respect to the size and dynamic range of the unit cell. If the pulse detection logic 826 is disabled, i.e., if the detection crossing is false ("no detection"), both integrators 834,838 are held in reset mode and pulse sampling stops. An integrated amplitude 842 output from amplitude integrator 834 may be compared to a provided sample resolution threshold 844 (e.g., an amplitude change threshold ΔAmp or Δ∫signal value) at comparator input 806. When the integrated amplitude 842 exceeds the sample resolution threshold 844, a logic value 848 is output from comparator 806 which controls a number of other operations. Logic value 848 causes a sample control function 851 to save the sample time integrator (time) output 850 of the sample time integrator 838 in a sample time buffer and resets the sample time integrator 838 and the level crossing integrator 834. Thus, the sample resolution threshold 844 may be used to "asynchronously" control the "sampling rate", i.e., there is no external timing clock determining sampling operation (or drawing system power.) For example, a smaller sample resolution threshold 844 value will result in generation of more frequent sampling. Following the capture of the time value, the sample control function 851 resets the sample time integrator 838.

Figure 8B:
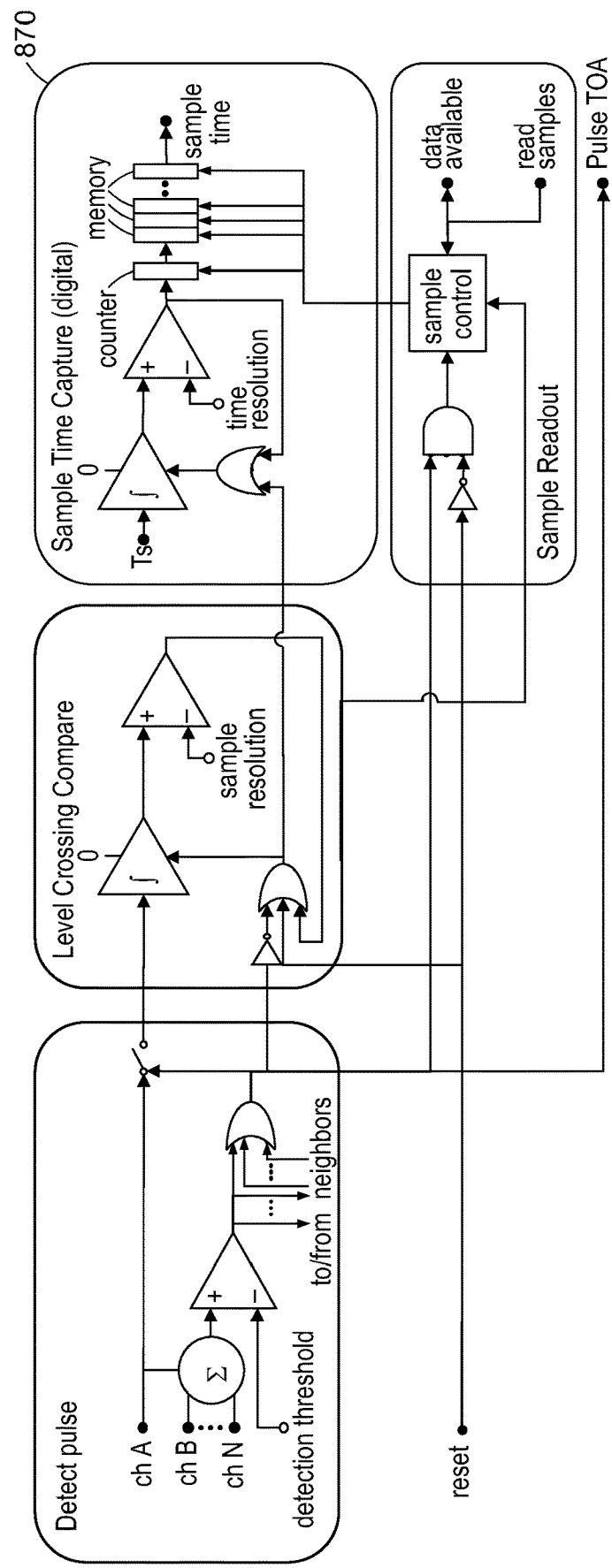

This process continues iteratively, until the photo-detector channel amplitude sum 816 falls below the threshold value 820, which disables the pulse detected logic 826, causing both integrators 834,838 to be held in reset state stopping the capture or time samples by the sample controller 851 and causing the sample control logic to send externally (i.e., outside the unit cell 800) that a data available signal 858, allowing an external control (e.g., DSP 625 in FIG. 6 to read the sample data 860 and associated pulse TOA 824 and sampling times 862. An external reset signal 864 may be used to hold all detection threshold crossings low (false) and reinitialize the sample control function 851. Within the sample time capture circuit 810 may be an optional parallel sample buffer 866 to perform time decimation if the number of samples is larger than the primary sample time buffer. From the acquired sampling data 824,860,862, conventional interpolation and/or curve fitting techniques may be used, and derivative/difference vectors created, to estimate the pulse's peak amplitude, and the angle of arrival for the pulse may be computed from delta/sum of the peak amplitudes. FIG. 8B provides an alternative embodiment, configured with a digital implementation of a sample time capture circuit 870.

Figure 9B:
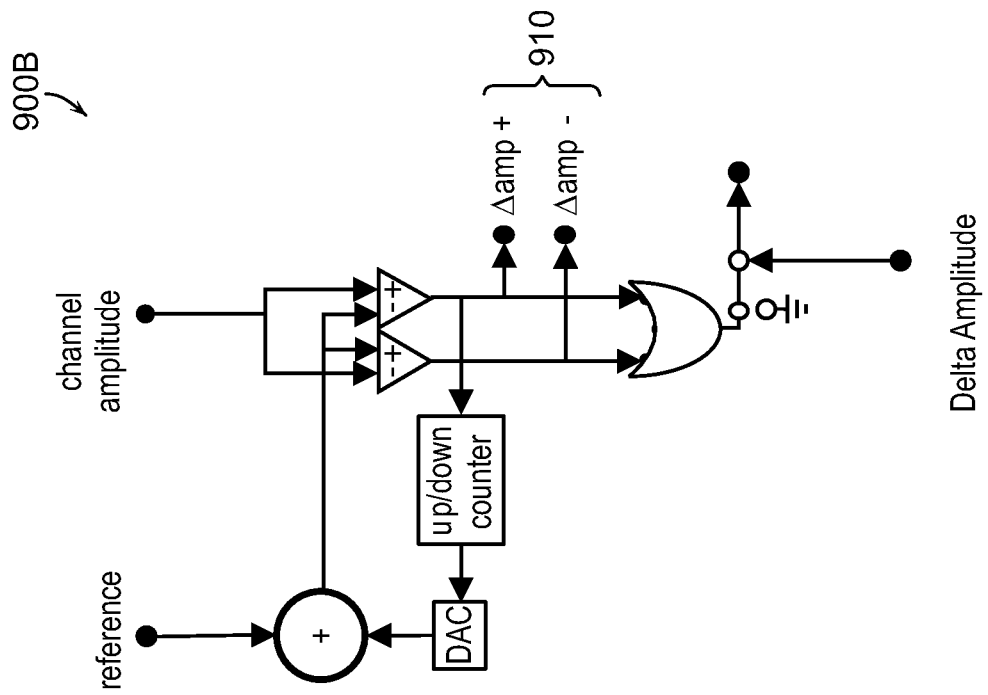
FIGS. 9A and 9B are exemplary comparator circuits.
Figure 9A:
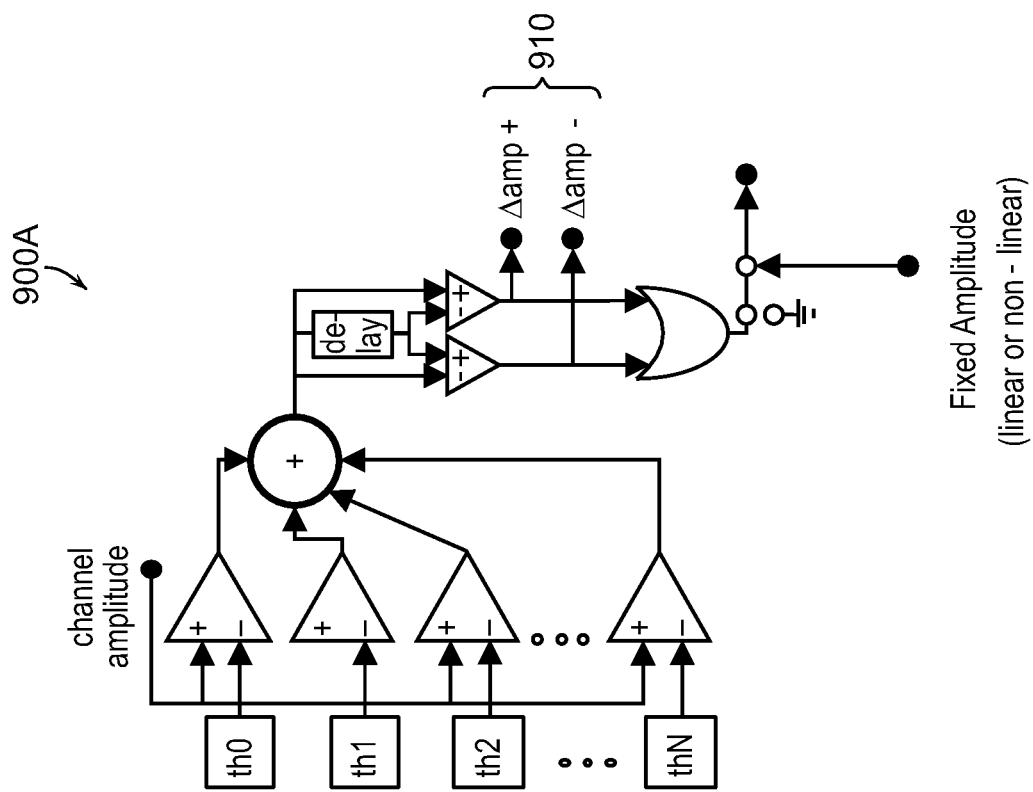

As illustrated in FIGS. 3 and 4 and describe above, asynchronous sampling may be dependent upon distinct types of pulse signal feature level crossing detections. The level crossing compare function 804 generates a pulse each time a specific amplitude, or delta amplitude, is achieved. The alternate circuit configurations 900A, 900B illustrated in FIGS. 9A and 9B may be substituted for the level crossing comparator 806 in the level crossing compare function 804. Binary level crossing direction values 910 may be captured and output with the time samples 862 to aid in reconstruction of the pulse signal.

Figure 10:
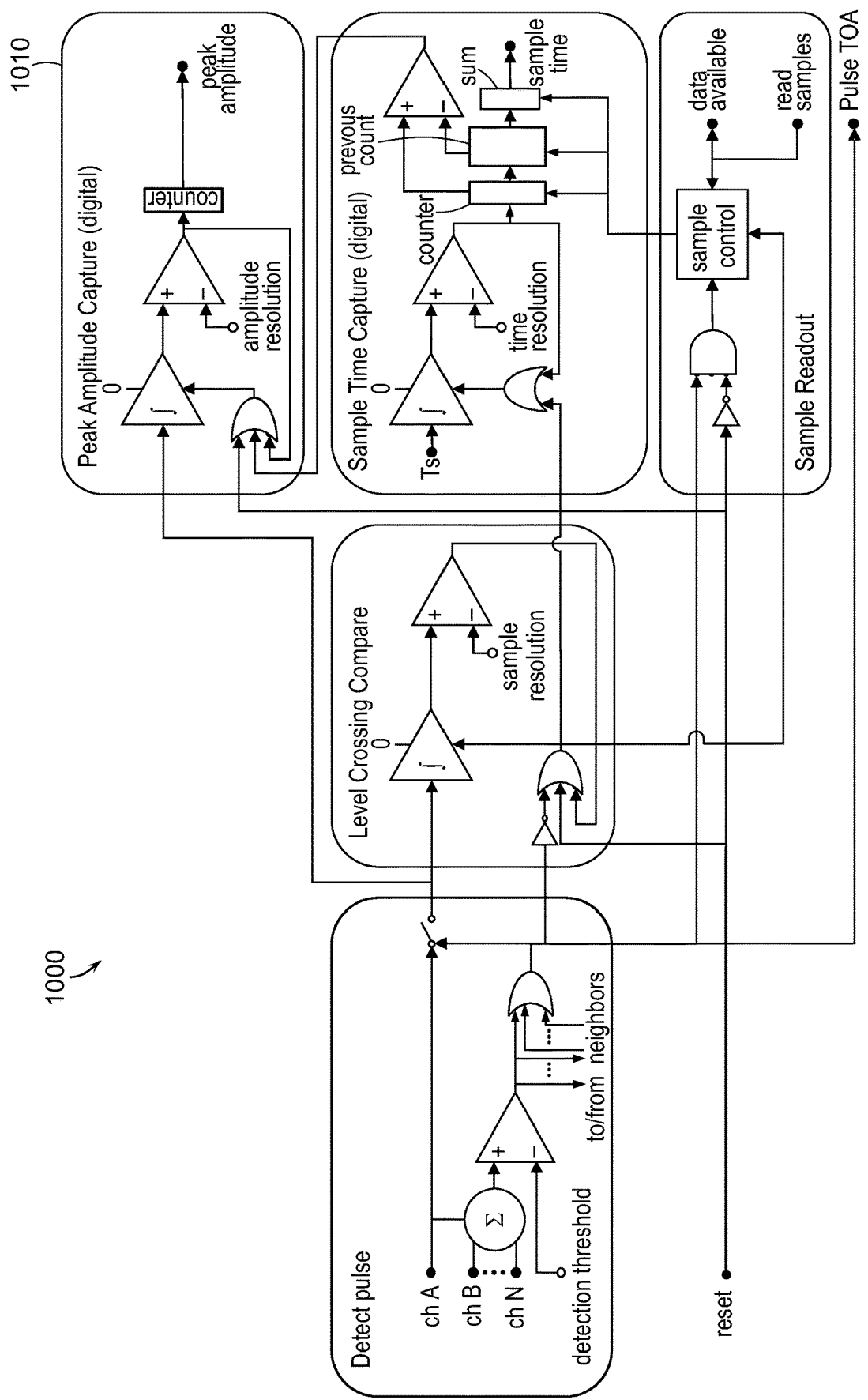
FIG. 10 is a block diagram of an alternate exemplary asynchronous sampling architecture utilizing a peak hold function.

Persons of skill in the art will readily appreciate that variations in the apparatus and/or techniques described herein are possible. For example, in some embodiments, multiple pulse amplitude or integrated pulse signal amplitude change threshold values may be utilized, triggering faster or slower sampling rates within intervals predetermined by a designer may be utilized (e.g., to create a dead band for hysteresis.) Alternative hardware and/or firmware architectures may also be employed. For example, FIG. 10 illustrates a signal processing architecture 1000 wherein the pulse detect, level crossing compare, sample time capture and sample control functions operate as described previously, but the architecture 1000 is additionally configured with a peak amplitude capture function 1010 for retaining the peak amplitude value of the pulse signal With reference again to the exemplary SAL line of sight (LOS) guidance application shown in FIG. 6, once pulse data available signal 858 is output by ROIC 610, digital processing module 625 may read the pulse data 860, which may include extracted pulse features such as rise time, fall time, amplitude, and time of arrival, pixel address, and noise. Digital processing module 625 may include conventional pulse data processing features, such as pulse qualification processing circuitry 650 and correlation processing circuitry 655. Pulse qualification processing circuitry 650 may analyze the extracted pulse feature data to determine if the detected laser pulses correspond to a predetermined laser designator. In one embodiment, pulse qualification processing circuitry 650 determines if the detected laser pulses correspond to the predetermined designator by comparing the amplitude, time of arrival, and/or the pixel address of the detected laser pulses to expected values. If the features of the detected laser pulse are determined to correspond to the predetermined designator, correlation processing circuitry 655 then processes the sample data (and other data) to generate LOS data (e.g., pitch and yaw angles) indicating the location of SAL seeker relative to the designated target from which the laser pulses were reflected. The correlation processing circuitry 655 may perform time-correlation on qualified pulses detected by pulse qualification circuitry 650 to determine if they occur at an expected repetition rate and to determine if the LOS calculations are acquiring and tracking a target. When operating in a SAL guidance mode, LOS data may be generated based upon only those signals that are indicative of laser pulse energy that has been verified or qualified as corresponding to at least one predetermined laser designator. Correlation processing circuitry 655 then outputs the line-of-sight data to a primary navigational computer, which utilizes the data to determine the appropriate guidance adjustments to flight control equipment to provide in-flight guidance. In various embodiments, pulse qualification and correlation processing can be performed in additional circuitry of ROIC 610, or in a combination thereof.

In view of the foregoing, various inventive methods, apparatus and systems disclosed herein relate generally to variable time sampling and associated digital processing circuitry, such as may be disposed in respective pixels of an array of a SAL receiver. The present disclosure, however, is not limited to laser receivers or the detection of a laser signal. For example, while certain disclosed embodiments may include a quad detector for detecting and tracking a laser source, other embodiments may include detectors suitable for detecting any other signal sources in which high-speed data analysis and collection using the disclosed signal detection and processing system may be desired. Such embodiments may include detectors and systems for analyzing signals relating to ultrasound, sonar, radar, and seismometer systems, among others. The disclosed embodiments may be implemented to include a variety of hardware configurations. In some cases, such configurations may offer compact, low-power, and reduced cost implementations providing enhanced detection and processing capability over traditional configurations.

The foregoing embodiments are therefore to be considered in all respects illustrative rather than limiting of the embodiments disclosed herein. Scope of the invention is thus indicated by the appended claims, rather than by the foregoing description, and all changes that come within the meaning and range of equivalency of the claims are therefore intended to be embraced therein.

No element, act, or instruction used herein should be construed as critical or essential unless explicitly described as such. Where only one item is intended, the term "one" or similar language is used. Also, as used herein, the terms "has", "have", "having", or the like are intended to be open-ended terms. Further, the phrase "based on" is intended to mean "based, at least in part, on" unless explicitly stated otherwise.

What is claimed is:

1. A method of variable time sampling, by a unit cell, of optical pulses incident on one or more photo-detecting elements, the method comprising:
   the unit cell detecting whether an amplitude of an optical pulse signal, received from and corresponding to an optical pulse incident on one or more of the photo-detecting elements, exceeds a sampling threshold; and
   while the optical pulse signal amplitude remains above the sampling threshold, iteratively sampling the optical pulse signal at a sampling rate that varies based on changes in the optical pulse signal amplitude.

2. The method of claim 1, wherein iteratively sampling the optical pulse signal comprises resetting an interval of the sampling rate upon each discrete detection of a change in the optical pulse signal amplitude exceeding at least one amplitude change threshold.

3. The method of claim 2, further comprising setting the at least one amplitude change threshold prior to iteratively sampling the optical pulse signal.

4. The method of claim 2, further comprising dynamically setting the at least one amplitude change threshold in response to an input.

5. The method of claim 1, wherein the sampling rate varies in proportion to changes in an integral of the optical pulse signal amplitude.

6. The method of claim 5, wherein iteratively sampling the optical pulse signal comprises resetting an interval of the sampling rate upon each discrete detection of a change in the optical pulse signal amplitude integral exceeding at least one amplitude integral change threshold.

7. The method of claim 1, further comprising increasing the sampling rate with increasing optical pulse signal amplitude, and decimating the sampling rate with decreasing optical pulse signal amplitude.

8. The method of claim 1, further comprising capturing a peak amplitude of the optical pulse signal when a time interval of the sampling rate is at a minimum.

9. The method of claim 1, further comprising reconstructing a pulse shape of the optical pulse signal from sampled data for the optical pulse signal, including a peak amplitude of the optical pulse signal.

10. The method of claim 1, wherein iteratively sampling the optical pulse signal further comprises:
    enabling pulse detection logic to simultaneously gate the pulse amplitude to a first integrator, enabling the first integrator and a sample time integrator, wherein if the pulse detection logic is disabled, the first integrator and sample time integrator are held in a reset state;
    comparing an integrated optical pulse signal amplitude output from the first integrator to a Δ-amplitude threshold that effectively determines the sampling rate; and
    if the integrated optical pulse signal amplitude output exceeds the Δ-amplitude threshold, capturing a Δt output of the sample time integrator associated with the integrated optical pulse signal amplitude output exceeding the Δ-amplitude threshold, and then resetting the sample time integrator and first integrator.

11. The method of claim 10, further comprising:
    when the pulse amplitude falls back below the sampling threshold, disabling the pulse detection logic, thereby resetting the first integrator and sample time integrator, and causing a sample controller to signal externally that optical pulse sampling data is available for reading.

12. The method of claim 10, further comprising feeding the sample time integrator a sample timing value $T_s$ that controls a time resolution of the sample time integrator.

13. The method of claim 10, further comprising enabling the pulse detection logic in response to control logic from a neighboring unit cell.

14. The method of claim 1, wherein the one or more photo-detecting elements comprises a plurality of adjacent pixels, and the method further comprising computing an angle of arrival of the optical pulse from changes in respective peak amplitudes measured by the plurality of adjacent pixels.

15. The method of claim 1, further comprising:
when the pulse amplitude falls back below the sampling threshold, signaling externally that optical pulse sampling data is available for reading.

16. The method of claim 1, further comprising capturing a time of arrival for the incident optical pulse when the optical pulse signal amplitude exceeds the sampling threshold.

* * * * *